(12) United States Patent
Pogde et al.

(10) Patent No.: US 9,916,203 B1
(45) Date of Patent: Mar. 13, 2018

(54) SPARSE METADATA SEGMENT TREE FOR EFFICIENT FILE STORAGE OPERATIONS IN EVOLVING BACKUP WORKLOADS (71) Applicant: EMC Corporation, Hopkinton, MA (US)

(72) Inventors: Prashant Pogde, Sunnyvale, CA (US); Yamini Allu, Santa Clara, CA (US); Mahesh Kamat, San Jose, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 293 days.

(21) Appl. No.: 14/755,114

(22) Filed: Jun. 30, 2015

(51) Int. Cl.
G06F 17/00 (2006.01)
G06F 11/14 (2006.01)
G06F 17/30 (2006.01)

(52) U.S. Cl.
CPC .... *G06F 11/1451* (2013.01); *G06F 17/30088* (2013.01); *G06F 17/30132* (2013.01); *G06F 17/30174* (2013.01); *G06F 17/30327* (2013.01); *G06F 2201/84* (2013.01)

(58) Field of Classification Search
CPC ............... G06F 17/30; G06F 17/30132; G06F 17/30589; G06F 17/30088
USPC .................................................. 707/600-899
See application file for complete search history.

(56) References Cited

U.S. PATENT DOCUMENTS

2007/0106632 A1* 5/2007 Bonwick ........... G06F 17/30091

* cited by examiner

*Primary Examiner* — Isaac M Woo
(74) *Attorney, Agent, or Firm* — Staniford Tomita LLP (57) ABSTRACT Embodiments are directed to a method of minimizing latency and input/output (I/O) operations in a data storage system by defining a sparse metadata segment tree to identify changed data blocks, wherein a full version of the tree is stored in a memory and modified versions of the tree are stored in cache memory, and using the sparse metadata segment tree to perform at least one data storage application including file verification, file replication, file restores, and file system snapshots.

17 Claims, 7 Drawing Sheets

BASE FILE LP TREE

FIG. 4A

UPDATED LP TREE

SPARSE METADATA SEGMENT TREE FOR EFFICIENT FILE STORAGE OPERATIONS IN EVOLVING BACKUP WORKLOADS

TECHNICAL FIELD

Embodiments are generally directed to data storage I/O operations, and more specifically to using a sparse metadata segment tree structure for efficient data storage operations.

BACKGROUND

Enterprise-scale backup operations often involve many different types of backup jobs or workloads. For regular backup workloads where an entire data corpus or data set of the backup is sent to a backup storage device (also called a backup appliance), a tree of metadata segments is often created that points to actual data segments. Typically a metadata segment covers a large portion of data segments, so the overhead of metadata for a copy of backup whose entire data is sent to the backup appliance (e.g., EMC's DDR system) is very small, and usually less than 0.05% of total backup size, for an average backup session. However, in newer formats of backups where only changed data (<1% of total backup size) is sent to an appliance but a full copy needs to be represented, the overhead of updating metadata and storing it can be extremely expensive. This overhead also makes it prohibitive to cache the metadata in solid-state disk (SSD) type of devices that wear out quickly with high churn.

Issues related to present backup solutions thus include high space cost per backup for high frequency backups and the high metadata overhead per snapshot, and a high cost for identifying changes across backups in terms of I/O operations, for the purposes of incremental replication, file-verification, and restores from the backup.

At present, the most common use cases of incremental forever workloads are LUN (Logical Unit Number) or VM (virtual machine) backups using Change Block Tracking (CBT) technology and virtual synthetic backups for file systems. In these workloads, the metadata updates could be as expensive as data update itself. Hence, efficiency in updating and storing metadata becomes very critical. With regard to identifying changed parts of a file system for replication, verification and restore operation, known solutions rely on differencing ("diffing") the file system tree representations, and such methods incur a great deal of overhead in walking through different versions of the file system tree and cataloguing the difference data.

What is needed, therefore, is a system and method improves the performance of large-scale backup operations by minimizing the processing and storage of metadata updates. What is further needed is a method and system of using a sparse metadata segment tree to facilitate efficient backup operations in evolving backup workloads.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, Data Domain Restorer, and Data Domain Boost are trademarks of EMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve automated backup related processes executed in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Embodiments are directed to a processing component in or associated with a backup server or memory controller that uses sparse metadata segment tree structures for efficient snapshots, versioning, replication, file-verification and restore operations in evolving and disparate backup workloads.

Figure 1:
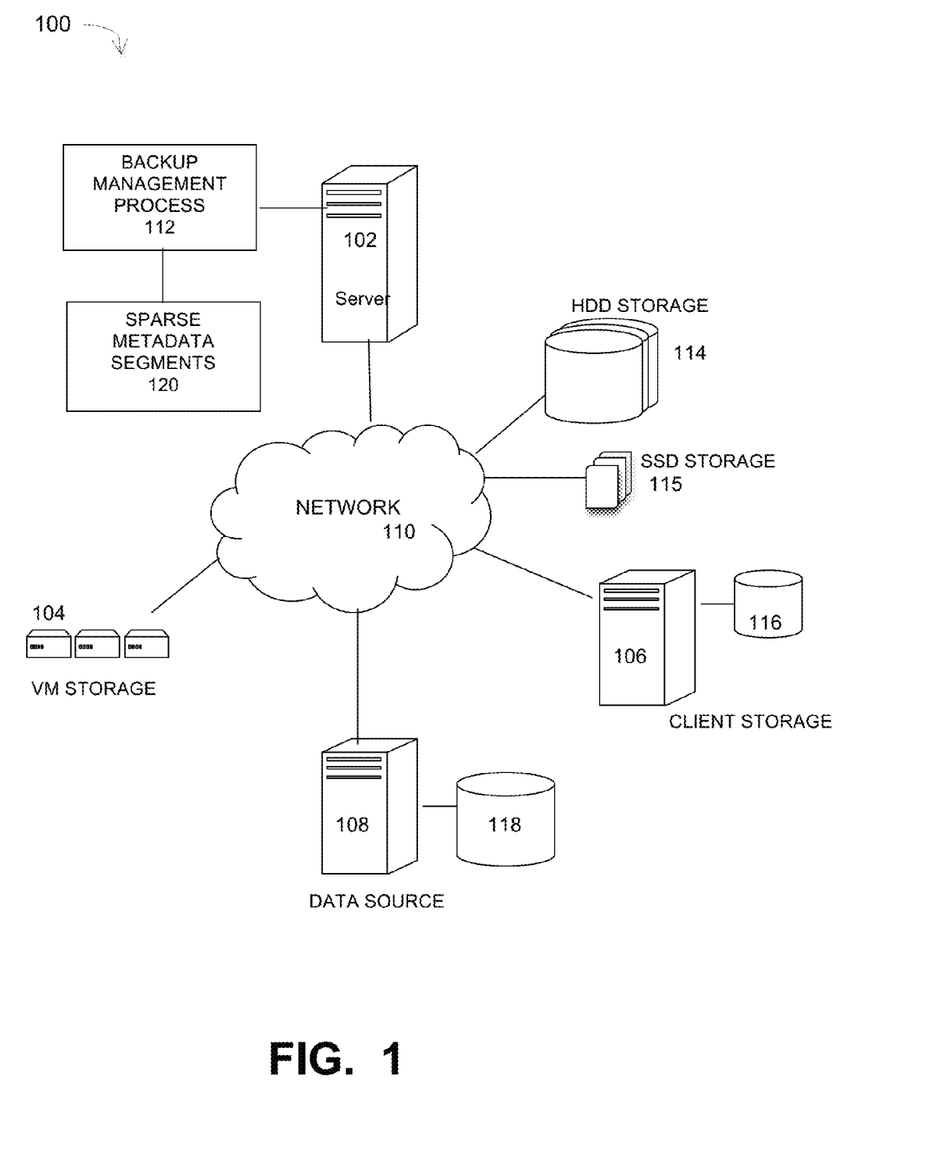
FIG. 1 illustrates a data storage system that implements one or more embodiments of a sparse metadata segment tree representation for backup operations, under some embodiments.

FIG. 1 illustrates a computer network system 100 that implements one or more embodiments of a large-scale network implementing a sparse metadata segment tree for high metadata churn workloads, under some embodiments. In system 100, a backup server 102 executes a backup management process 112 that coordinates or manages the backup of data from one or more data sources 108 to storage devices, such as HDD 114 or SSD 115 network storage, client storage 106, and/or virtual storage devices 104. With regard to virtual storage 114, any number of virtual machines (VMs) or groups of VMs may be provided to serve as backup targets, and the target VMs may also be organized into one or more vCenters (virtual centers) having many VMs each. The network storage devices serve as target storage devices for data backed up from one or more data sources, such as computer 108, which may have attached local storage 118 or utilize networked accessed storage devices 114, 115.

The data sourced by the data source may be any appropriate data, such as database data that is part of a database management system. In this case, the data may reside on one or more hard drives (e.g., 118) and may be stored in the database in a variety of formats. One example is an Extensible Markup Language (XML) database, which is a data persistence software system that allows data to be stored in XML format. Another example is a relational database management system (RDMS) that uses tables to store the information. Computer 108 may represent a database server that instantiates a program that interacts with the database. Each instance of a database server may, among other features, independently query the database and store information in the database, or it may be an application server that provides user interfaces to database servers, such as through web-based interface applications or through virtual database server or a virtual directory server applications.

A network server computer 102 is coupled directly or indirectly to the network storage devices 114, 115, client storage 116, data sources 108, and VMs 104 through network 110, which may be a cloud network, LAN, WAN or other appropriate network. Network 110 provides connectivity to the various systems, components, and resources of system 100, and may be implemented using protocols such as Transmission Control Protocol (TCP) and/or Internet Protocol (IP), well known in the relevant arts. In a distributed network environment, network 110 may represent a cloud-based network environment in which applications, servers and data are maintained and provided through a centralized cloud computing platform. In an embodiment, system 100 may represent a multi-tenant network in which a server computer runs a single instance of a program serving multiple clients (tenants) in which the program is designed to virtually partition its data so that each client works with its own customized virtual application, with each VM representing virtual clients that may be supported by one or more servers within each VM, or other type of centralized network server.

The data generated or sourced by system 100 may be stored in any number of persistent storage locations and devices, such as local client storage, server storage (e.g., 118). The backup process 112 causes or facilitates the backup of this data to other storage devices of the network, such as network storage 114, 115 which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays. In an embodiment, the target storage devices, such as disk array 114 may represent any practical storage device or set of devices, such as fiber-channel (FC) storage area network devices, and OST (OpenStorage) devices. In an embodiment, a one or more dedicated client storage machines 106 may be provided with access to local storage media 116 or an interface to the network storage devices. For the embodiment of FIG. 1, the network storage devices comprise both individual or arrays of hard disks (HDD) 114 or solid-state drives (SSD) 115. The SSD devices 115 may be embodied as flash drives or any other similar solid-state memory device.

For the embodiment of FIG. 1, network system 100 includes a server 102 that executes a data backup process with a functional component 120 that provides a sparse-segment metadata segment tree representation for the backup data. The backup management process 112 automates the backup of network data using the target storage devices. In an embodiment, the process 112 uses certain known full and incremental backup techniques along with a process or system component 120 to back up data in an efficient manner with respect to the overhead associated with updating and storing the metadata.

In an embodiment, system 100 may represent a Data Domain Restorer DDR)-based de-duplication storage system, and storage server 128 may be implemented as a DDR De-duplication Storage server provided by EMC Corporation. However, other similar backup and storage systems are also possible. System 100 may utilize certain protocol-specific namespaces that are the external interface to applications and include NFS (network file system) and CIFS (common internet file sys n) namespaces, as well as DD Boost provided by EMC Corporation. In general, DD Boost (Data Domain Boost) is a system that distributes parts of the de-duplication process to the backup server or application clients, enabling client-side de-duplication for faster, more efficient backup and recovery. A data storage deployment may use any combination of these interfaces simultaneously to store and access data. Data Domain (DD) devices in system 100 may use the DD Boost backup protocol to provide access from servers to DD devices. The DD Boost library exposes APIs (application programming interfaces) to integrate with a Data Domain system using an optimized transport mechanism.

As shown in FIG. 1, the backup system includes a sparse metadata segment tree process 120 for efficient update and storage of metadata on SSD 115 as well as HDD 114 based storage systems. This process provides methods of improving the efficiency of file metadata updates in a snapshot-based and/or de-duplicated storage system, such as that shown in FIG. 1.

In an embodiment, the sparse metadata segment tree process 120 stores/caches file metadata on SSD devices with reduced churn and high storage efficiency to support low latency writes. This helps reduce wear of the SSDs significantly for newer backup workloads and customer environments that need higher frequency of backups. It also provides a solution to store multiple versions of a backup/file efficiently by reducing amount of metadata stored per version; and it reduces the IOPS (input/output operations per second) requirement significantly from the storage subsystem. It further addresses the metadata update problem associated with small random overwrite updates scattered throughout existing backup files.

In a de-duplicated file-system that forms segments from data, these segments are uniquely identified by their key/ label called as fingerprint. Given a file offset and length, the corresponding data segment fingerprints need to be looked up. To provide faster offset to fingerprint lookup the mapping is stored in a Merkle tree format where the leaf nodes represent data segments and their fingerprints are stored in the parent nodes which are metadata segments. In a Merkle tree, every non-leaf node is labeled with the hash of the labels of its children nodes to allow efficient and secure verification of the contents of large data structures.

For a file system that supports large files that are accessed mostly sequentially, the overhead of the metadata segments in terms of space and I/O is relatively low. Large files and sequential accesses are typical in traditional backup workloads. However, for a system that supports random write workloads and small updates to large files, metadata segment accesses and updates can impose much greater processing/storage overhead and become extremely expensive. Typical random writes happen to overwrite an existing file. Overwrites on a de-duplication system with Merkle tree representation require loading metadata segments prior for read-modify-write operations. In cases where a metadata segment represents a large span of data, any minor changes trigger the entire metadata segment to be read, updated and written back. This causes higher latencies for random writes as well as R/W (read/write) amplification.

To overcome this problem, the de-duplication backup system, such as that shown in FIG. 1, provides a sparse metadata segment tree representation for efficient update and storage on network storage devices including SSD as well as HDDs. This representation and process 120 provides methods to reduce the amount of read modify writes by storing updated data segments in sparse metadata segments. In most use cases for random overwrites, the de-duplication appliance segments data at the application block boundaries to avoid unnecessary read modify write of data segments. Any I/O is aligned to existing data segment boundaries and hence the new references will align with the overwritten references in metadata segment. This allows the backup process to postpone the metadata segment update to a later time.

Figure 2:
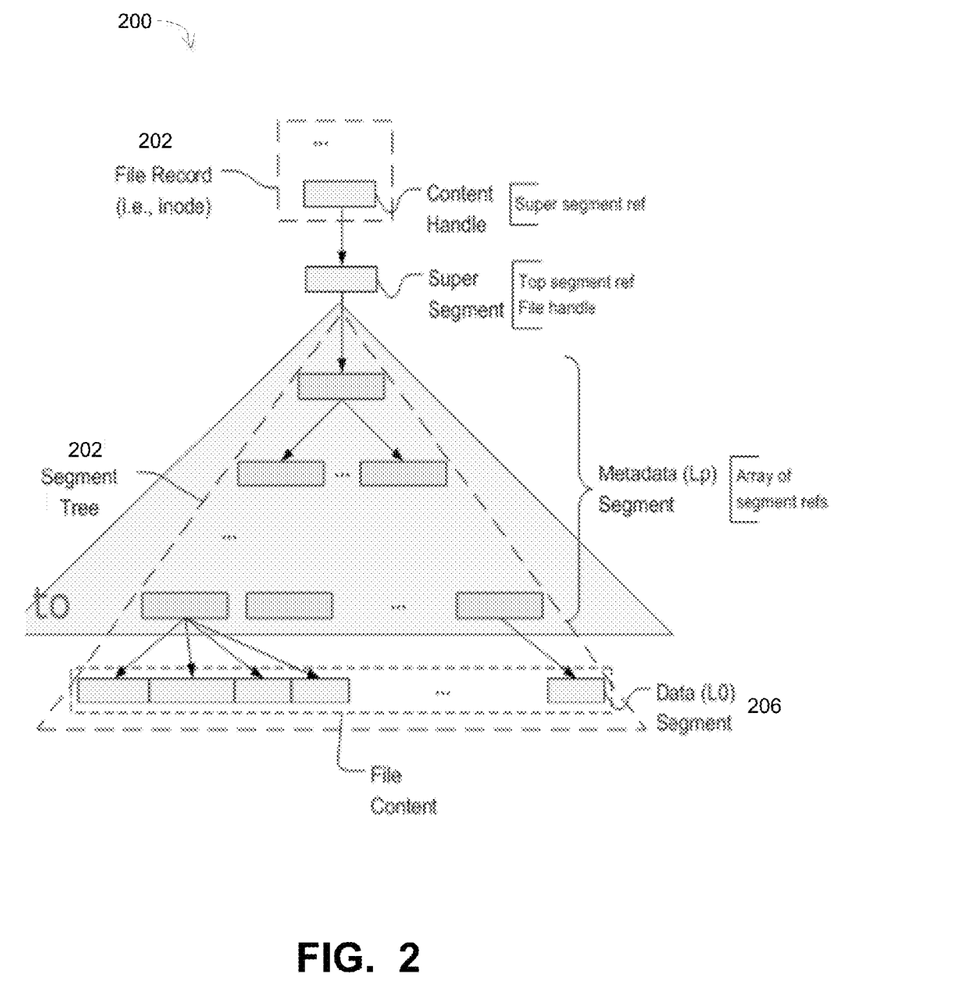
FIG. 2 illustrates the organization of metadata segments in a sparse metadata segment tree, under an embodiment.

FIG. 2 illustrates the organization of metadata segments in a sparse metadata segment tree, under an embodiment. For purposes of description and as shown in diagram 100, "Lps" refer to metadata segments that contain references to data/ metadata segments, thus the term Lp or LP means level one or above segments in the metadata tree and are the actual metadata segments that belong to a file. The file record 202 is referred to by a content handle, and segment tree 204 provides the path to the data (L0) segment 206. The lowest level Lp segment (L1) covers on average 4 Mb of data segments (L0:L1=512:1). For reads metadata segments need to be loaded first in order to get the data segment references. For overwrites, Lp segments need to be read to modify the child references that changed.

Figure 3:
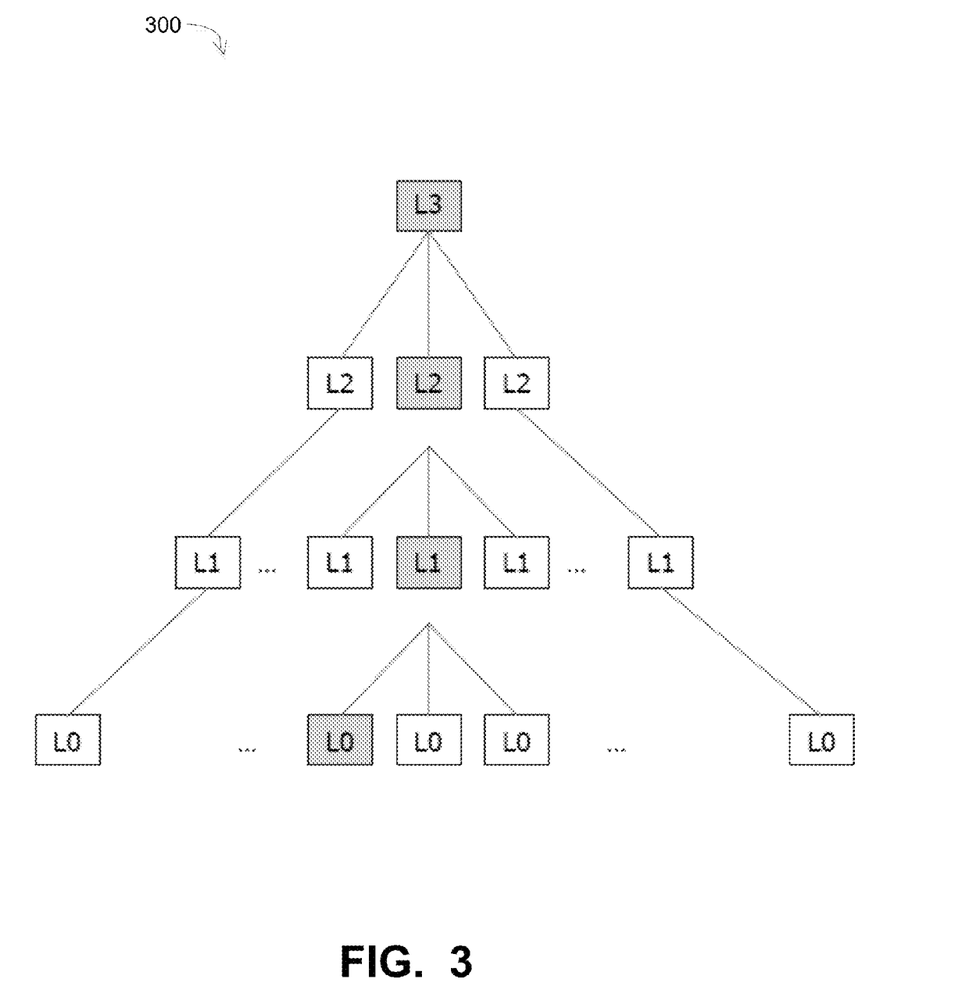
FIG. 3 illustrates an example of a random write process with a reference cache using a sparse metadata segment tree, under an embodiment.

FIG. 3 illustrates an example of a random write process with a reference cache using a sparse metadata segment tree, under an embodiment. For the example of diagram 300 it is assumed that writes are aligned with segment boundaries (for CBT, VM backups, etc.). The process forms L0 segment references for data. Cache modified L0 references are kept in memory until the corresponding L1 is read. A seg_ref entry in L1 is updated to point to the new L0 segment. Lps are evicted when the stream quota is met, and updates ripple up the Lp tree. The process then forms a content handler (ch or CH) on sync or stream close. In an example of a current LP cache design, for a stream cache the system can cache up to 32 L1s for each open stream. Once a stream is evicted from the stream cache the system keeps the Lp data in a shared Lp cache indexed by its fingerprint. Pages from the shared cache are reclaimed to an Lp page pool when the Lp page pool is out of pages.

For an LP cache on an SSD device, the system stores Lp segments that are evicted from the global shared cache in the SSD cache. The system will decide which Lps to insert into the SSD cache based on workload characteristics and will query the SSD Lp index to lookup the SSD cache before issuing a load from an on-disk counter. The system will use a generic SSD caching module to perform inserts/lookups and evictions.

In an embodiment, the system maintains a delta Lp cache on the SSD. For cases in which random writes are small and uniformly distributed there is a 1:1 L0 to L1 update and three-times (3x) application for writes, such that for example every 8 k write yields a 16 KB L1 write out. Only one full copy of a segment tree is cached in memory or in the SSD for a generation 0 (Gen 0) of a file. From then on the cache stores only a sparse version of the segment tree that consists of only the modified references at each level. Upon reads to the sparse Lp, the original version of the Lp is read from the SSD and merged with the changes. Assuming a 1% change rate and an average file size of 100 GB, the system needs only about 4 MB per backup to cache all sparse L1s (new L0 references), unlike the 400 MB for each backup when the full Lp is cached. Depending on the read latency and IOPS for the SSD devices, the system needs to write a full Lp after only a few generations of an LP to reduce the number of reads from the SSD to form a fill LP from the delta Lps.

Figure 4A:
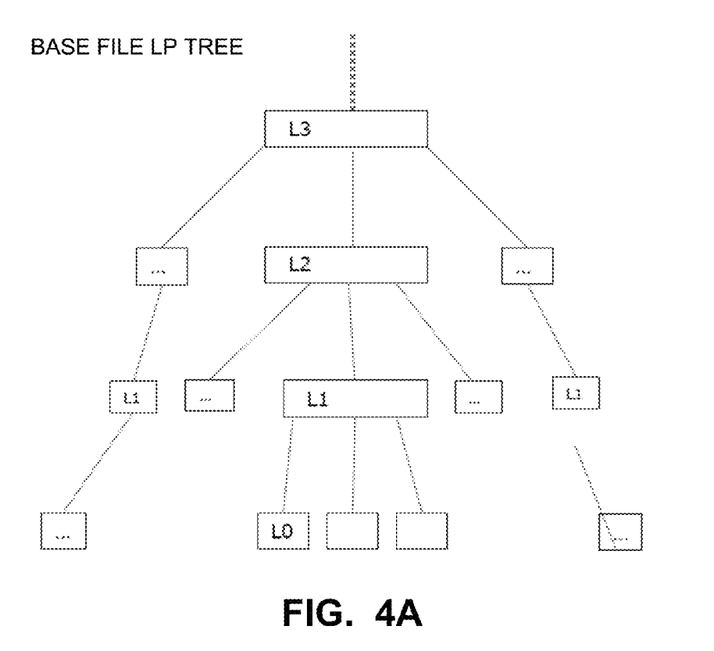
FIG. 4A illustrates an LP tree for a base file under an example implementation.
Figure 4B:
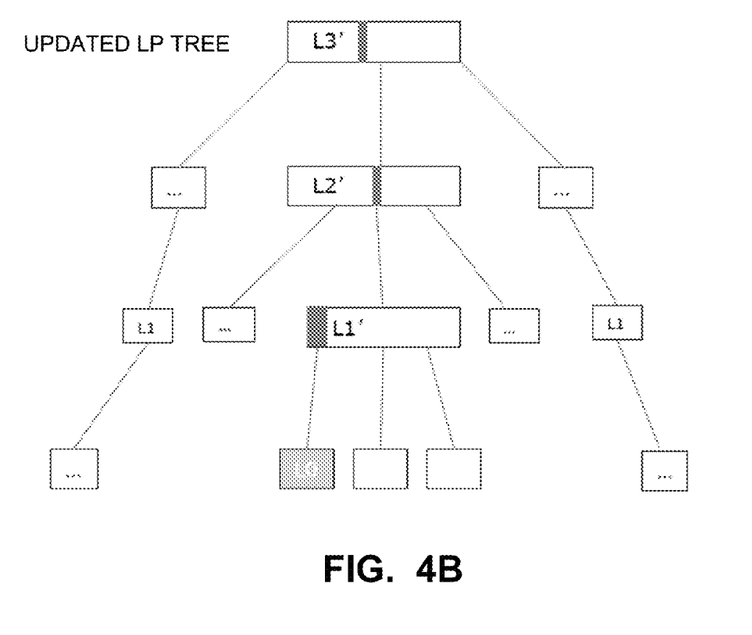
FIG. 4B illustrates an updated version of the LP tree of FIG. 4A under the example implementation.
Figure 5:
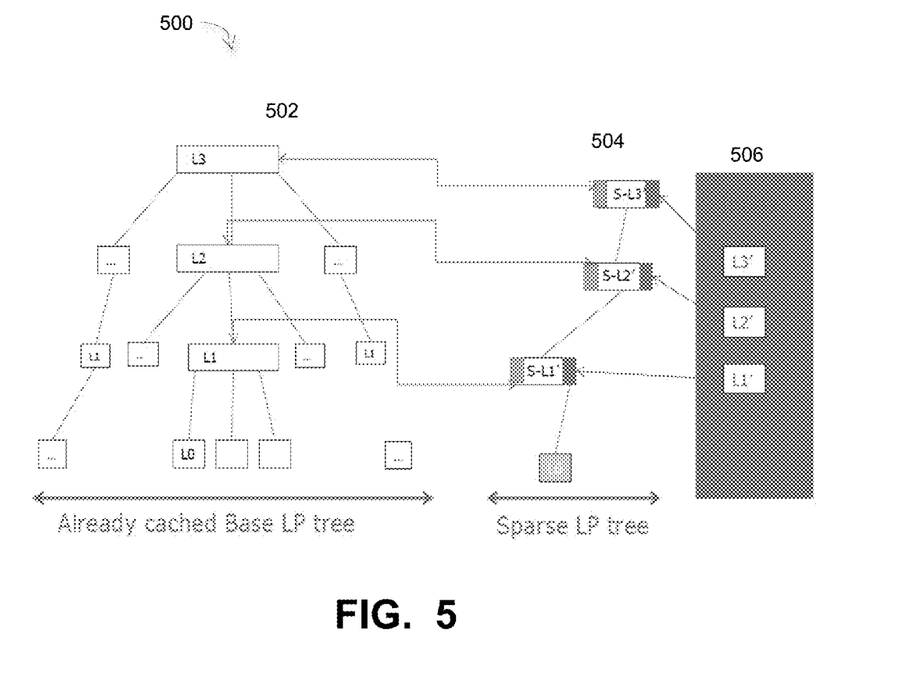
FIG. 5 illustrates an updated base Lp tree plus a sparse Lp tree under an embodiment.

FIG. 4A illustrates an Lp tree for a base file under an example implementation, and FIG. 4B illustrates an updated version of the Lp tree of FIG. 4A under the example implementation. FIG. 5 illustrates an updated base Lp (e.g., from FIG. 4B) tree plus a sparse Lp tree under an embodiment. In diagram 500, an already cached base Lp tree 502 generates a sparse Lp tree 504 and the Lx entries are stored in index 506. The tree structures of FIGS. 4A and 4B are intended to be for example purposes only, and other trees might also be possible.

For write operations on the delta Lp cache on SSD devices the process issues a load of L1 entries that are needed in an asynchronous fashion. The process forms L0 segments and writes them to the segment store on disk, but caches the L0 references in memory (in a reference cache) until the L1 is loaded. Once the load of original L1 entries is complete they are merged with the L0 entries from the reference cache for that L1 range and the updated L1' is written to disk. The L1' is removed from memory or cache when the stream quota for L1s is reached. The original L1 is cached in the SSD. The L0 references in the reference cache belonging to L1' (fingerprint') are not evicted until file close or quota for the reference cache is reached. During eviction of the reference cache, a sparse S-L1' containing the fingerprint of the original L1 and just the modified L0s is formed. This sparse L1' is inserted into the SSD cache with fingerprint' (fingerprint of L1') as the key. The sparse tree only is stored on the SSD device with no change to disk layout.

For delta Lp cache reads, when an L1' needs to be read, the fingerprint is looked up in the memory/SSD cache. If the LP happens to be a sparse/delta Lp that does not cover the offsets that are required by the read, its base Lp is read (e.g., from the SSD) and merged with the delta Lp. If the original lookup for L1' on the SSD failed or the base L1 of the L1' is not in the SSD cache, L1' needs to be read from the disk. All L1s written to disk are complete and thus no merge is required.

With regard to representation for the delta Lps, there are two possible incomplete Lp representations. First L1' can have a header with a valid bitmap for each of the possible 2048 L0 references. Alternatively L1' can have an offset, L0 reference array. The header would also contain the fingerprint of the original L1 and number of valid references. If the fingerprint of the original references matches the fingerprint of L1', then this L1 is complete and is not a sparse L1. The system also keeps a generation number for the delta Lp, which can be useful to determine when to cache a full Lp to SSD.

Figure 6:
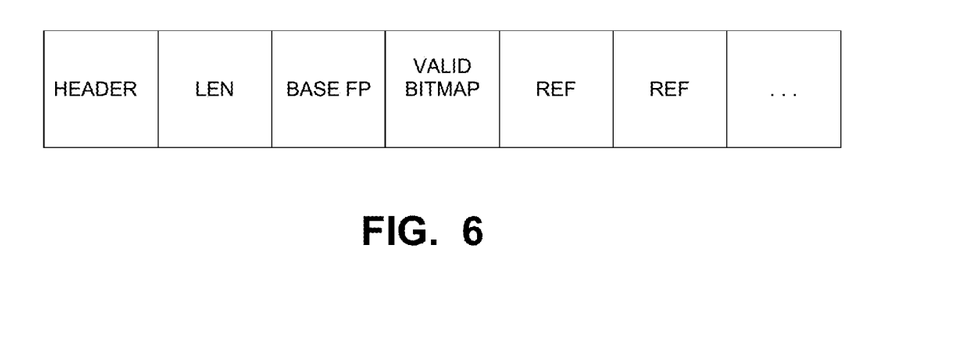
FIG. 6 illustrates a sparse LP format, under some embodiments.

FIG. 6 illustrates a sparse Lp format, under some embodiments. As shown in diagram 600, the sparse Lp data format comprises a header field followed by an Len, base fingerprint, and valid bitmap field followed by a series of reference fields. The format of FIG. 6 is intended to be for example, and other similar formats and data field definitions may also be used.

For a sparse metadata segment tree on disk, HDD, rather than SSD, and assuming that the system only ever needs to write an Lp to modify it and form the cache-hit for the modified file. To avoid the Lp read altogether during writes, the system can generate a delta content handle from the modified sparse metadata segment tree. The system continues to generate just the delta versions of the content handles for several generations of the same file (e.g., v1, v2, etc.) This keeps the metadata bloat on the system low and proportional to the change rate and not its distribution.

In this embodiment, for synthetic replication, only the data pointed to by the delta tree needs to be replicated if it is known that the base file is on the destination. Only when a full restore/replication/tapeout is required do the delta trees need to be merged to form a full segment tree. Since the different version (vx) of the segment trees are delta versions only, they can be cached in an SSD. The system can also keep a copy of these versions on disk to provide better protection. Any reads can do an on-demand merge of incremental copies of the segment tree. Eviction from the SSD cache can trigger a merge of incremental copies because the merge from on-disk copies is generally expensive.

Sparse Segment Trees to Reduce Latency and I/Os

Figure 7:
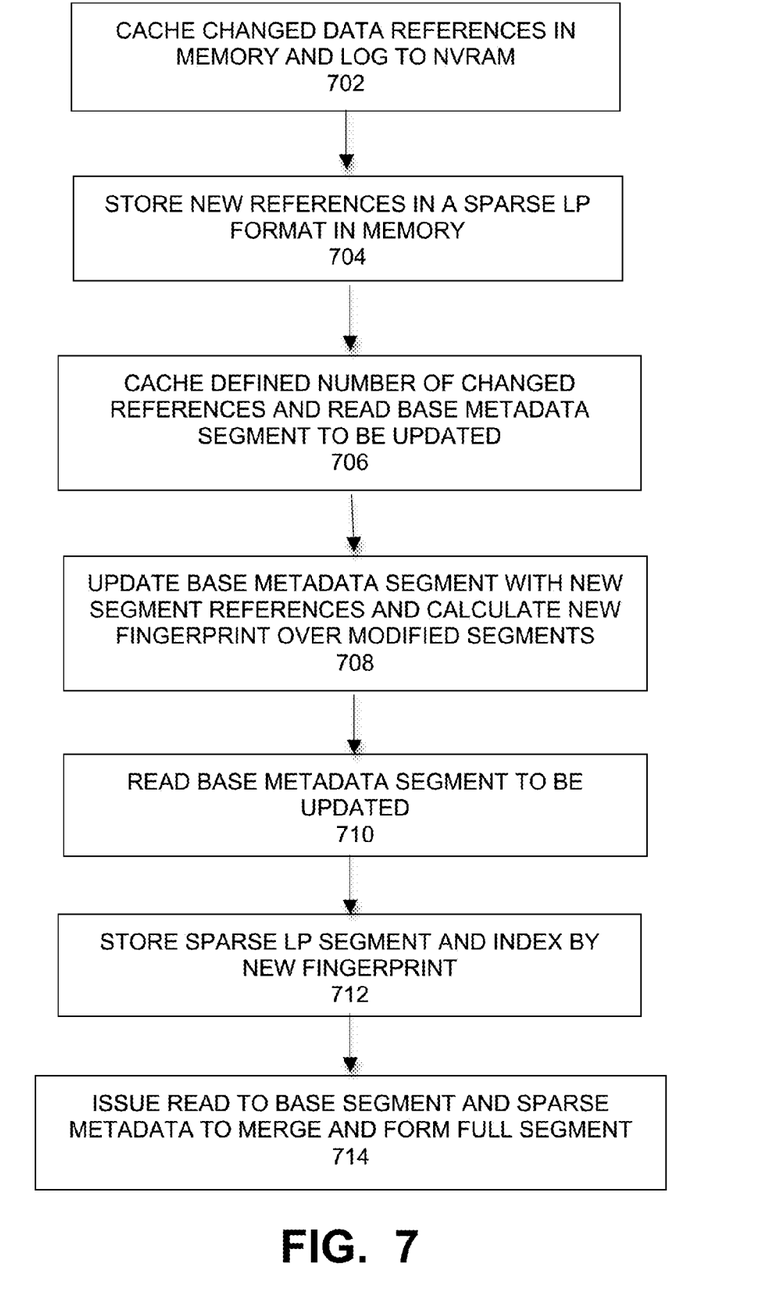
FIG. 7 is a flowchart that illustrates a method of using a sparse metadata segment tree to reduce latency and IOPS under some embodiments.

The sparse metadata segment tree representation can be used to reduce latency and IOPs for metadata in several different scenarios. FIG. 7 is a flowchart that illustrates a method of using a sparse metadata segment tree to reduce latency and IOPS under some embodiments. As shown in FIG. 7, upon an overwrite operation, the system caches delta (changed data references) in memory and logs them to NVRAM (nonvolatile memory) and acknowledges the write to the client, 702. This removes the overhead of metadata updates during writes. The new references are stored in a sparse Lp format in memory, 704. After a pre-determined number of references have been cached, the base metadata segment that needs to be updated is read and is updated with the new segment references and a new fingerprint (fp') is calculated over the modified segments, 706. The sparse Lp segment will be stored on stable storage indexed by the newly computed fingerprint (fp') and will contain reference to the base fingerprint (fp) before the update, 708. On a read to an updated metadata segment, the system will issue read to the base segment as well as the sparse metadata to merge and form the full segment in memory, 714.

As an example, assume the base revision of the file is r0. The first incremental create r1 of the file that will be represented by the delta-LP-tree. Similarly, subsequent revisions of the files would be called r2, r3 . . . rn. Each incremental tree will represent changes to metadata segments in the file since the previous version. i.e., ri, will represent changed portions of segment tree since ri−1. This means, in the worst case where the read spans entire metadata segment, we may need to read up to "i" segments from disk. To avoid this, the system can choose to merge the incremental update with a full update on a periodic basis, or per a defined schedule. Another option is to merge an incremental with a previous incremental on every segment tree update and write out a full update when the incremental update reaches a certain size threshold value. In this case, ri would represent cumulative incremental changes form version 1 to version i. The memory footprint for such a representation would be proportional to change rate of data and not the change rate of metadata for that file.

The advantage of this representation is explained with an example of a 100 GB file. If it is assumed that there is a 1% change rate in data and a metadata segment that covers 4 MB data segment, the system would need 4 MB for storing sparse metadata segments for revision r0 of the file. If for every ri, the sparse metadata segment is merged with cumulative changes up to ri−1, after 10 revisions of the file the process would consume only 160 MB of storage as opposed to 4 GB of storage for representing the LP tree of the backup file. This represents a significant savings of 40 times, for this example. Another savings is realized with the number of I/O operations to storage. With the sparse-tree representation described herein, after 10 revisions of the file, the system will need 440 IOPS from SSD to store sparse metadata segment as opposed to 50K IOPS for storing full updated metadata segment. For a hard disk the system would need to write only stripe write for every incremental as opposed to ~100 stripe sized writes per incremental backup.

With respect to the use of the sparse metadata segment tree on specific target devices, such as SSDs and HDDs, certain characteristics of these devices are specifically accommodated under certain embodiments. For example, SSDs are known for low latency random I/O operations. However, to have a longer lifecycle for SSDs the amount of SSD overwrites need to be minimized. For faster metadata accesses in a storage system, file systems may cache their metadata in SSDs. For cases where a metadata segment covers a large portion of data segments and the I/O is truly random with high IOPS and distributed changes, metadata segments are updated at the same rate as data segments. This will cause high churn on SSDs and hence caching the new updated segment as-is will not be possible. The sparse metadata segment tree aptly works for this situation in that the system will only cache updated portion of a metadata segment, which keeps the updates to SSDs minimal.

With regard to HDDs, as mentioned earlier, with random writes, the overhead of metadata segments is very high. For a de-duplicated and/or versioning file system that supports large files and multiple versions of the large files, the overhead of metadata becomes extremely expensive. On a system that supports caching metadata on SSDs, the representation of a segment tree can be made compact on disk without affecting performance. Using sparse metadata segment trees can keep multiple versions of the file and make more efficient use of storage and IOPS. On overwrites, the system maintains the sparse metadata segment and stores only the sparse metadata segment for each file version both on SSD and on disk. A merge of incremental metadata segment in SSD also results in merge on disk. Reads to an updated Lp segment will always be served from SSDs in the manner described above. The incremental Lp tree on disk is there mostly for crash recovery. This approach offers additional benefits of improving write latencies, better IOPS utilization on disk and improved throughput.

In an embodiment, the sparse metadata segment tree representation provides a new segment-tree-layout or disk-layout for the file system, and a disk-layout that accommodates incremental changes to the file system by creating strictly incremental delta to the disk layout representing the file system without causing any write amplification for either the data or the metadata. The incremental tree structured layout that provides better IOPS utilization and space saving for variety of backup, nearline and random I/O workloads. Use of incremental file system tree layout at metadata level on SSD cache to minimize the write churn and control write amplification on SSDs. Use of incremental file system, tree layout at metadata level on disks or slower storage media to minimize the IOPS requirement from the slower storage media, and the use of heuristics and novel algorithms to avoid explosion of multiple incremental versions of the same file. This provides good read latencies from a file that has seen multiple random incremental changes over time. The use of heuristics and novel algorithms that can combine SSDs and disks while using our proposed incremental-tree-layout to provide optimal space and IOPS usage across SSDs and DISKs and other slower media and provide better read/write latencies for the file.

Efficient Replication, Verification and Restores Using Sparse Segment Tree

As described above, the sparse metadata segment tree representation allows for efficient update and storage of backup data on SSD and HDD-based storage systems. The sparse metadata segment tree also allows for the process to encode efficient snapshots and efficiently identify the changed parts of the file system for faster replication, file-verification and instant-restores. This allows for efficient snapshots with evolving new use cases in the customer backup environment, and to identify changed blocks for the purpose of file-verification, replication and restores.

In an embodiment, the sparse metadata segment tree is used as a way to encode information regarding changed portions of a file tree and can complement a full segment tree. Only the sparse metadata segment tree needs to be read to find changes between backups, hence the amount of metadata read is directly proportional to data change rate and not the metadata change rate. The overhead of a sparse metadata tree depends on the data change rate and change distribution. Assuming 512:1 data to metadata segment ratios, the overhead of metadata segments versus data for a full backup is about 0.5%. For a virtual full backup whose change rate is only 1%, the sparse metadata segment tree overhead would be 0.5% of (1% of total backup size) which is very little overhead compared to 0.5% of total backup size.

Figure 8:
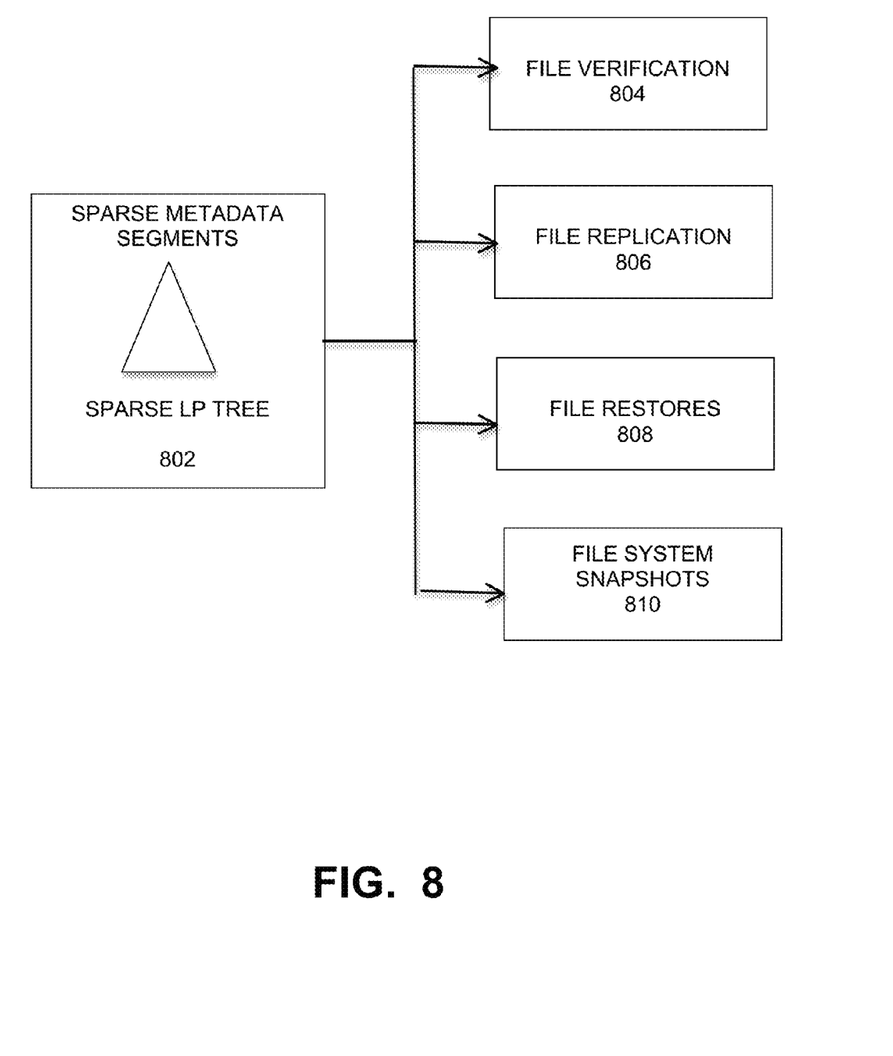
FIG. 8 illustrates the use of the sparse metadata segment tree by different applications, under an embodiment.

This allows the system to store a metadata segment tree in very little space and use very few IOPS to enumerate/iterate the tree to find changed portions of a file. Thus, different applications can use the sparse metadata segment tree to improve performance. FIG. 8 illustrates the use of the sparse metadata segment tree 802 by different applications, including file verification 804, file replication 806, file restores 808, and file system snapshots 810.

With respect to using sparse LP trees for efficient file verification 804, with increased number of versions of the same file with minor changes, verifying the file logically every time it is updated becomes expensive. Methods to detect which portion of the file has changed since last version also require complex tracking or additional I/O and compare operations at metadata segment level. The sparse metadata trees eliminate the need to keep any complex tracking or reading of metadata to find changes. For verifying any recently modified file, the verification process only needs to verify data represented by the sparse metadata segment tree. The verification process can further be expanded to verify the merged LP tree at the time of merging of sparse tree with the original LP tree.

With respect to using sparse LP trees for efficient file replication 806, similar to file verification, replication is expensive operation if every version of a file needs to be logically replicated. Unnecessary index lookups can be avoided for de-duplication processes by finding changes between last version and only sending the changed data to destination. The sparse metadata segment tree can be used to replicate only the changed part without requiring any differencing operation.

With respect to using sparse LP trees for efficient file restores 808, an incremental file-restore can work by finding out the differences between the good version that user has and the recent-most version of the file that the user lost. An incremental restore application then works by applying these differences to the good version of the file that user has. This saves many I/O cycles as well as data transfer over the network. The sparse metadata segment tree can be used to send only the changed part without requiring any differencing operations.

With respect to using sparse LP trees for efficient file system snapshots 810, the sparse tree representation is used to maintain snapshots of the file system. A sparse metadata tree avoids the need to have a complete metadata or Lp tree of the file and needs space proportionate only to the change rate of the file and hence it is more space efficient. Such a scheme can also be rolled-up from file level all the way to the root of the file system tree (mtree/utree) and can help reduce file system level metadata churn for nearline workloads.

Thus, application of the sparse metadata segment tree layout or incremental file-system disk layout to a wide variety of storage technologies that includes but is not limited to file-verification, replication, incremental restores, snapshots, can greatly reduce the latency and IOPS overhead associated with present differencing solutions. The sparse tree structure provides an incremental tree structured layout that allows for efficient tracking of changes between different file versions or changes between two different file system snapshots. The use of incremental file system, tree layout at metadata level that can be walked down and traversed directly to send incremental changes for the purpose of replication, file-verification and instant restores.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of minimizing latency and input/output (I/O) operations in a data storage system, comprising:
   defining a sparse metadata segment tree to identify changed data blocks, wherein a full version of the tree is stored in a memory and modified versions of the tree are stored in cache memory, wherein the memory comprises one of a hard drive (HDD) memory or solid state (SSD) memory;
   using the sparse metadata segment tree to perform at least one data storage application selected from the group consisting of: file verification, file replication, file restores, and file system snapshots;
   caching changed data references to the changed data blocks as metadata segments; and
   determining if a minimum number of changed data references have been cached and if so, updating a base metadata segment with a new metadata segment and fingerprint calculated over modified segments from a base fingerprint.

2. The method of claim 1 further comprising:
   storing a sparse metadata segment the memory;
   indexing the new metadata segment by the new fingerprint that contains a reference to the base fingerprint; and
   upon a read to the updated metadata segment, issue the read to the base metadata segment and the sparse metadata segment to merge and form a full segment in the memory.

3. The method of claim 2 wherein the sparse metadata segment tree comprises an incremental tree structure based on a Merkle tree scheme.

4. The method of claim 3 wherein the sparse metadata segment tree complements a full segment tree comprising a sum of full segments stored in the memory, and wherein the at least one data storage application reads only the sparse metadata segment tree to find changes in the files between backup operations.

5. The method of claim 4 wherein the amount of metadata read by the at least one data storage application is proportional to a data change rate, and not a metadata change rate.

6. The method of claim 5 wherein the file verification application detects portions of a file that have been changed to verify a modified file, and wherein the sparse metadata segment tree contains changed data that is checked by the verification application.

7. The method of claim 5 wherein the verification process further verifies the merged tree at time of merging of the sparse tree with the original tree.

8. The method of claim 5 wherein the file replication application identifies changes between a last version and a present version, and wherein the sparse metadata segment tree is used to replicate only a changed part of the file.

9. The method of claim 5 wherein the file restore application comprises an incremental file restore process that determines differences between a present good version of a file and a recent lost version of the file, and wherein the sparse metadata segment tree is used to send only the changed part of the file.

10. The method of claim 5 wherein the file system snapshot application maintains snapshots of the file system and the sparse metadata segment tree is used to provide changed information for files in the file system and avoids the need to have a complete metadata representation of each of the files.

11. A system minimizing latency and input/output (I/O) operations for data storage applications, comprising:
   a first component defining a sparse metadata segment tree to identify changed data blocks, wherein a full version of the tree is stored in a memory and modified versions of the tree are stored in cache memory, wherein the memory comprises one of a hard drive (HDD) memory or solid state (SSD) memory;
   a second component using the sparse metadata segment tree to perform at least one data storage application of the data storage applications and selected from the group consisting of: file verification, file replication, file restores, and file system snapshots;
   a cache memory storing changed data references to the changed data blocks as metadata segments, wherein the second component determines if a minimum number of changed data references have been cached and if so, updates a base metadata segment with a new metadata segment and fingerprint calculated over modified segments from a base fingerprint;

a persistent memory storing a sparse metadata segment the memory; and a third component indexing the new metadata segment by the new fingerprint that contains a reference to the base fingerprint and, upon a read to the updated metadata segment, issuing the read to the base metadata segment and the sparse metadata segment to merge and form a full segment in the persistent memory.

12. The system of claim 11 wherein the sparse metadata segment tree comprises an incremental tree structure based on a Merkle tree scheme and complements a full segment tree comprising a sum of full segments stored in the memory, and wherein the data storage applications read only the sparse metadata segment tree to find changes in the files between backup operations, and further wherein the amount of metadata read by the at least one data storage application is proportional to a data change rate, and not a metadata change rate.

13. The system of claim 12 wherein the file verification application detects portions of a file that have been changed to verify a modified file, and wherein the sparse metadata segment tree contains changed data that is checked by the verification application, and wherein the verification process further verifies the merged tree at time of merging of the sparse tree with the original tree.

14. The system of claim 12 wherein the file replication application identifies changes between a last version and a present version, and wherein the sparse metadata segment tree is used to replicate only a changed part of the file.

15. The system of claim 12 wherein the file restore application comprises an incremental file restore process that determines differences between a present good version of a file and a recent lost version of the file, and wherein the sparse metadata segment tree is used to send only the changed part of the file.

16. The system of claim 12 wherein the file system snapshot application maintains snapshots of the file system and the sparse metadata segment tree is used to provide changed information for files in the file system and avoids the need to have a complete metadata representation of each of the files.

17. A computer program product, comprising a non-transitory computer-readable medium having a computer-readable program code embodied therein, the computer-readable program code adapted to be executed by one or more processors to minimizing latency and input/output (I/O) operations in a data storage system, comprising:

defining a sparse metadata segment tree to identify changed data blocks, wherein a full version of the tree is stored in a memory and modified versions of the tree are stored in cache memory, wherein the memory comprises one of a hard drive (HDD) memory or solid state (SSD) memory;

using the sparse metadata segment tree to perform at least one data storage application selected from the group consisting of: file verification, file replication, file restores, and file system snapshots;

caching changed data references to the changed data blocks as metadata segments; and determining if a minimum number of changed data references have been cached and if so, updating a base metadata segment with a new metadata segment and fingerprint calculated over modified segments from a base fingerprint.

* * * * *